United States Patent
Shigefuji et al.

(10) Patent No.: US 11,027,664 B2
(45) Date of Patent: Jun. 8, 2021

(54) REARVIEW MONITOR APPARATUS

(71) Applicant: HONDA MOTOR CO., LTD., Tokyo (JP)

(72) Inventors: Yasuyuki Shigefuji, Wako (JP); Shunsuke Osafune, Wako (JP); Akinori Myoi, Wako (JP); Susumu Seki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 115 days.

(21) Appl. No.: 16/580,228

(22) Filed: Sep. 24, 2019

(65) Prior Publication Data

US 2020/0114832 A1   Apr. 16, 2020

(30) Foreign Application Priority Data

Oct. 12, 2018  (JP) .............................. JP2018-193446

(51) Int. Cl.
*B60R 11/02* (2006.01)
*B60R 1/00* (2006.01)
(Continued)

(52) U.S. Cl.
CPC .......... *B60R 11/0235* (2013.01); *B60K 37/02* (2013.01); *B60R 1/00* (2013.01);
(Continued)

(58) Field of Classification Search
CPC ....... B60R 2011/0005; B60R 2011/001; B60R 2011/0033; B60R 2011/0235; B60R 1/00;
(Continued)

(56) References Cited

U.S. PATENT DOCUMENTS 10,899,228 B2 * 1/2021 Shigefuji ................ B60R 11/04
2017/0182943 A1 * 6/2017 Hoenninger ............. B60Q 9/00
(Continued)

FOREIGN PATENT DOCUMENTS

DE   102014005803   9/2015
JP   11-255020   9/1999
(Continued)

OTHER PUBLICATIONS

German Office Action for German Patent Application No. 102019215484.0 dated Mar. 12, 2020.

*Primary Examiner* — Gregory A Blankenship
(74) *Attorney, Agent, or Firm* — Amin, Turocy & Watson LLP (57) ABSTRACT

A rearview monitor apparatus includes: a display provided on an instrument panel; and a housing formed to surround a periphery of the display, wherein the housing includes an upper surface arranged above the display, a side surface arranged at the outside in a vehicle width direction of the display, and a visor that extends in a vehicle rearward direction beyond the display from vehicle rearward positions of the upper surface and the side surface and that forms an opening part in a vehicle rearward direction, and a first recess part of which a depth gradually increases toward a vehicle frontward direction towards the inside in the vehicle width direction from an outer end in the vehicle width direction is formed on the upper surface side of the visor.

6 Claims, 6 Drawing Sheets

(51) Int. Cl.
  *B60K 37/00* (2006.01)
  *B60K 37/02* (2006.01)
  *H05K 5/00* (2006.01)
  *B60R 11/00* (2006.01)

(52) U.S. Cl.
  CPC ...... *H05K 5/0017* (2013.01); *B60K 2370/152* (2019.05); *B60K 2370/21* (2019.05); *B60K 2370/65* (2019.05); *B60R 2011/0005* (2013.01); *B60R 2011/0043* (2013.01); *B60R 2300/8066* (2013.01)

(58) Field of Classification Search
  CPC .... B60R 1/04; B60K 37/02; B60K 2370/152; B60K 2370/1526; B60K 2370/176; B60K 2370/171; B60K 2370/682; B60K 2370/691; B60K 2370/21; B60K 2370/65; B62D 25/14
  See application file for complete search history.

(56) References Cited

U.S. PATENT DOCUMENTS

| | | | | |
|---|---|---|---|---|
| 2017/0344826 | A1* | 11/2017 | Kanematsu | B60Q 9/00 |
| 2017/0349098 | A1* | 12/2017 | Uhm | B60K 35/00 |
| 2018/0262719 | A1* | 9/2018 | Jo | H04N 5/23293 |
| 2020/0079182 | A1* | 3/2020 | Sato | B60H 1/242 |
| 2020/0164898 | A1* | 5/2020 | Urushizaki | B60K 35/00 |
| 2020/0167114 | A1* | 5/2020 | Hayashida | H04N 7/18 |
| 2020/0180509 | A1* | 6/2020 | Rodriguez Ortiz | H04N 5/247 |
| 2020/0247217 | A1* | 8/2020 | Doi | B60H 1/243 |
| 2020/0269697 | A1* | 8/2020 | Hayashida | B60K 37/02 |
| 2020/0279514 | A1* | 9/2020 | Lee | B60R 1/00 |
| 2020/0406755 | A1* | 12/2020 | Davis | B60K 37/02 |

FOREIGN PATENT DOCUMENTS

| | | |
|---|---|---|
| JP | 2010-188903 | 9/2010 |
| JP | 5397887 | 1/2014 |
| WO | 2019/009321 | 1/2019 |

* cited by examiner

REARWARD ←→ FRONTWARD

FIG. 6

REARVIEW MONITOR APPARATUS

CROSS-REFERENCE TO RELATED APPLICATION

Priority is claimed on Japanese Patent Application No. 2018-193446, filed on Oct. 12, 2018, the contents of which are incorporated herein by reference.

BACKGROUND

Field of the Invention

The present invention relates to a rearview monitor apparatus.

Background

Recently, a technology using a camera monitoring system (CMS) has been proposed as a rearview monitor apparatus which replaces a door mirror for a vehicle (for example, refer to Japanese Patent No. 5397887). The camera monitoring system displays an external image captured by a camera on a display provided in a vehicle room. A driver checks behind the vehicle by looking at the image displayed on the display.

The camera monitoring system can reduce the size of the system compared to the door mirror, improve the safety, and reduce a wind noise.

It has been considered that the display is arranged on both sides of an instrument panel in a vehicle width direction while matching a line of sight along which the display of the camera monitoring system is viewed with a line of sight along which a conventional door mirror is viewed as much as possible so that the driver can use the camera monitoring system without discomfort as in the conventional door mirror.

However, in a case of such an arrangement, there is a possibility that external light is reflected on the display, and it becomes difficult to see the display. Therefore, a technology in which a visor is provided above the display and which prevents the external light from reflecting on the display is disclosed.

SUMMARY

However, when the visor is provided as in the related art described above, the driver may feel a sense of pressure in front of the driver, the occupant's comfort in the driver seat may deteriorate, and a driver's hand may be caught by the visor.

An aspect of the present invention provides a rearview monitor apparatus capable of preventing a driver's hand from being caught by a visor without degrading an occupant's comfort in a driver seat while ensuring good visibility of a display.

A rearview monitor apparatus according to an aspect of the present invention includes: a display provided on an instrument panel of a vehicle, arranged further outward in a vehicle width direction than a range in which a steering is projected in a front-to-rear direction of the vehicle, and that displays a captured external image to a driver; and a housing formed to surround a periphery of the display, wherein the housing includes an upper surface arranged above the display, a side surface arranged at the outside in the vehicle width direction of the display and that faces the outside, and a visor that extends in a vehicle rearward direction beyond the display from vehicle rearward positions of the upper surface and the side surface and that forms an opening part in a vehicle rearward direction, and a first recess part of which a depth gradually increases toward a vehicle frontward direction towards the inside in the vehicle width direction from an outer end in the vehicle width direction is formed on the upper surface side of the visor.

According to such a configuration, the visor overhangs rearward of the vehicle at the outside of the visor in the vehicle width direction, and a distance between the driver and the visor becomes longer therefrom toward the inside in the vehicle width direction. Therefore, at the outside in the vehicle width direction of the rearview monitor apparatus, the visor prevents the external light from reflecting on the display. Further, it is also possible to reduce the reflection of the display on a side window. Accordingly, it is possible to ensure good visibility of the display.

Further, at the inside in the vehicle width direction of the rearview monitor apparatus close to the driver, since it is possible to sufficiently ensure the distance between the visor and the driver, it is possible to prevent the driver's hand from being caught by the visor without degrading the occupant's comfort in the driver seat.

In the rearview monitor apparatus described above, the visor may be arranged obliquely so as to extend in a vehicle rearward direction towards the outside in the vehicle width direction, and a second recess part recessed in a vehicle frontward direction with respect to a rear end of an upper surface of the instrument panel and that continues to the first recess part may be formed at the inside in the vehicle width direction on the upper surface side of the visor.

According to such a configuration, it is possible to further prevent the external light from reflecting on the display. Further, it is also possible to reliably reduce the reflection of the display on the side window. Furthermore, since it is possible to further sufficiently ensure the distance between the visor and the driver, it is possible to further prevent the driver's hand from being caught by the visor without degrading the occupant's comfort in the driver seat.

In the rearview monitor apparatus described above, an outer end portion in the vehicle width direction of the second recess part may be located between an outermost portion in the vehicle width direction of the projected range of the steering and the inside in the vehicle width direction of a range in which the display is projected in the front-to-rear direction of the vehicle.

According to such a configuration, it is possible to reliably ensure the distance between the visor and the driver, and it is possible to reliably prevent the driver's hand from being caught by the visor. Further, it is possible to prevent it from occurring that the display is hard to see due to an obstacle such as the steering, the driver's arm, and the driver's hand.

In the rearview monitor apparatus described above, in the upper surface of the visor, a part at the outermost in the vehicle width direction of the projected range of the steering may be located at a vehicle forefront position.

According to such a configuration, it is possible to reliably ensure the distance between the visor and the driver effectively. Therefore, it is possible to reliably prevent the occupant's comfort in the driver seat from being degraded, and it is possible to reliably prevent the driver's hand from being caught by the visor.

According to an aspect of the present invention, at the outside in the vehicle width direction of the rearview monitor apparatus, the visor prevents the external light from reflecting on the display. Therefore, it is possible to ensure good visibility of the display. Further, at the inside in the vehicle width direction of the rearview monitor apparatus close to the driver, since it is possible to sufficiently ensure the distance between the visor and the driver, it is possible to prevent the driver's hand from being caught by the visor without degrading the occupant's comfort in the driver seat.

DESCRIPTION OF EMBODIMENTS

Next, an embodiment of the present invention will be described with reference to the drawings.

Figure 1:
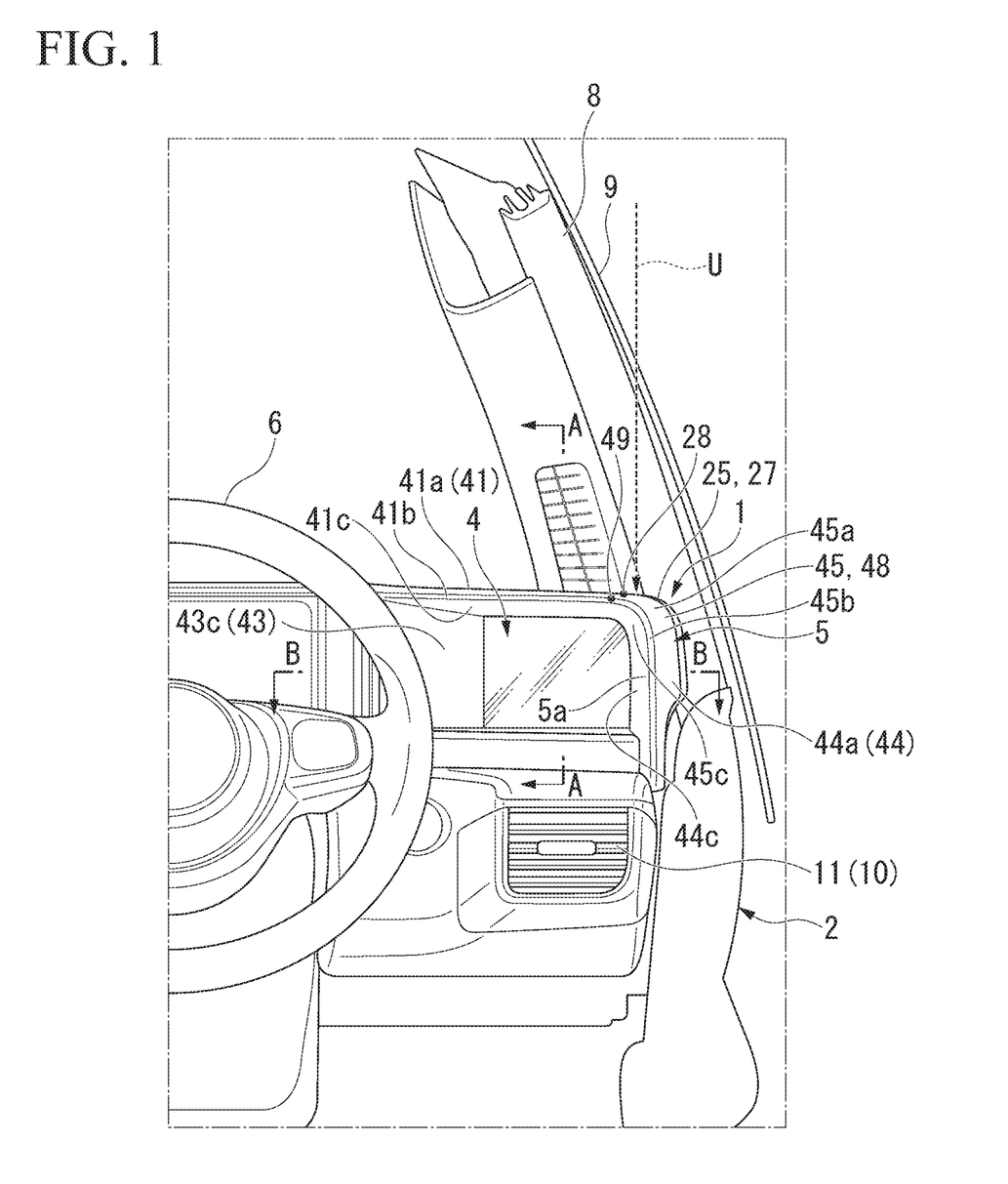
FIG. 1 is a view of a camera monitoring system according to an embodiment of the present invention when seen from a driver seat side of a vehicle.

FIG. 1 is a view of a camera monitoring system 1 (rearview monitor apparatus) when seen from a driver seat side of a vehicle 2.

The camera monitoring system 1 is provided on both sides of the vehicle 2 in a vehicle width direction. Only the driver seat side is shown in FIG. 1. However, the camera monitoring system 1 is also provided on a passenger seat side. The basic configurations of these two camera monitoring systems 1 are the same. The two camera monitoring systems 1 are arranged in line symmetry with respect to a middle in the vehicle width direction. In the following description, only the camera monitoring system 1 on the driver seat side will be described, and the description of the camera monitoring system 1 on the passenger seat side will be omitted. However, portions on the driver seat side and the passenger seat side which may have different configurations will be separately described.

In the following description, forward and rearward in a traveling direction of the vehicle 2 will be simply referred to as forward and rearward. Upward and downward in a vertical direction may be referred to simply as upward and downward. A direction perpendicular to the vertical direction may be referred to as a horizontal direction.

(Vehicle)

First, the vehicle 2 will be described.

The vehicle 2 includes, in addition to an instrument panel 3, a steering 6 arranged on the driver seat side and provided at a rearward position of the instrument panel 3, a front pillar 7 that constitutes a vehicle width direction side part of the vehicle, and the like. The front pillar 7 extends obliquely upward from a front of the instrument panel 3 toward a rear thereof. Further, the front pillar 7 extends obliquely slightly inward to a vehicle room from the front toward the rear.

The front pillar 7 also constitutes part of a frame of a side door 9 provided so as to perform opening and closing operations with respect to the front pillar 7. When the side door 9 is closed, the side door 9 is closed in a state where a weather strip 8 attached to the front pillar 7 is slightly compressed. Thereby, the seal property between the front pillar 7 and the side door 9 is secured. In the present embodiment, when the term "front pillar 7" also includes the weather strip 8 attached to the front pillar 7.

(Camera Monitoring System)

Figure 2:
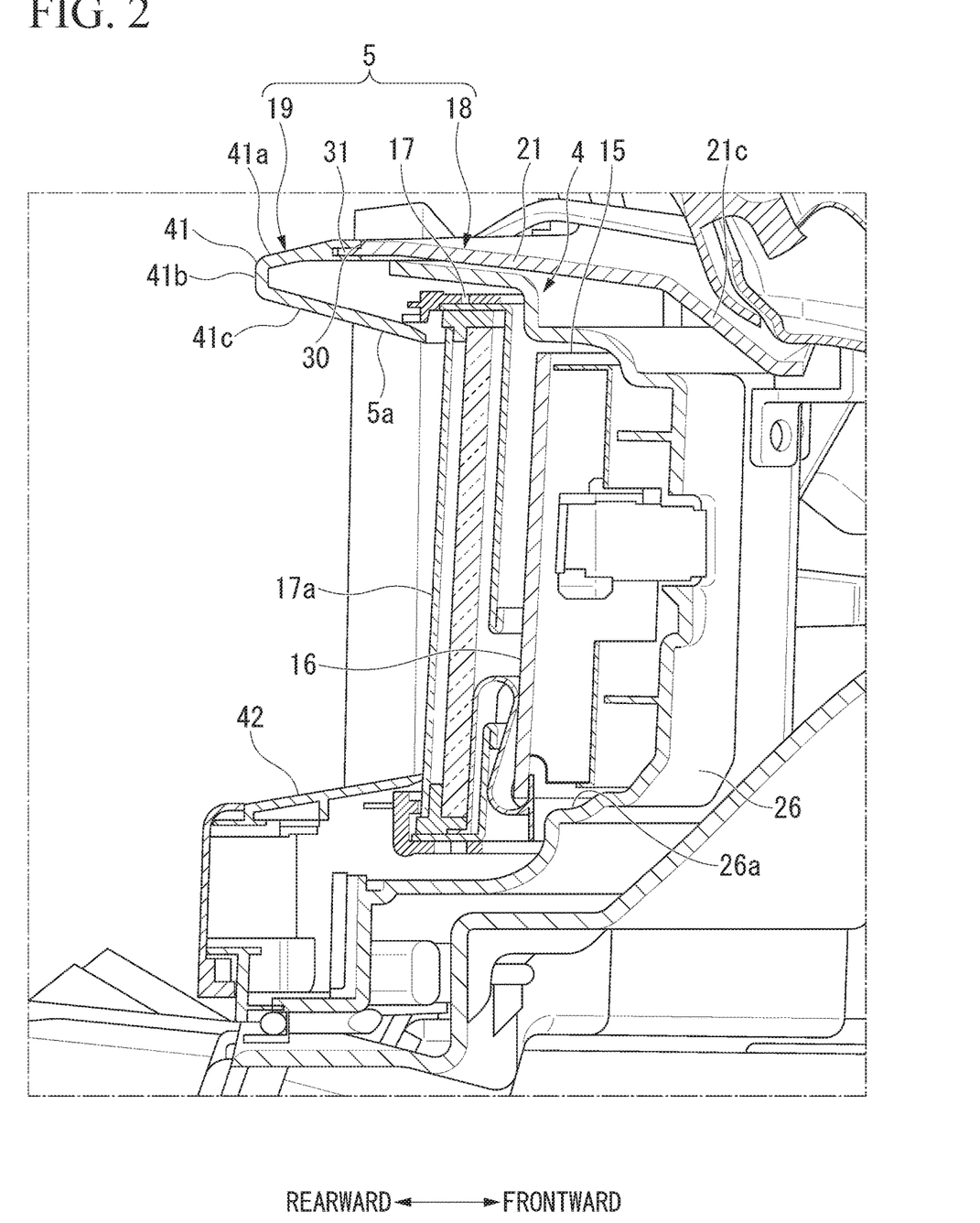
FIG. 2 is a cross-sectional view along an A-A line of FIG. 1.

FIG. 2 is a cross-sectional view along an A-A line of FIG. 1.

As shown in FIG. 1 and FIG. 2, the camera monitoring system 1 includes a display device 4 provided on the upper side and on both sides in the vehicle width direction of the instrument panel 3 and a housing 5 formed so as to surround the periphery of the display device 4. For example, an air outlet 11 of a car air conditioner 10 is provided below the camera monitoring system 1 of the instrument panel 3.

(Display Device)

The display device 4 includes a display 17 and a control part 15 arranged in front of the display 17. The display 17 displays an external image captured by a rear camera (not shown) which is provided on an outer side surface (for example, a side surface (not shown) of the side door) of the vehicle 2 in the vehicle width direction to a driver.

Figure 3:
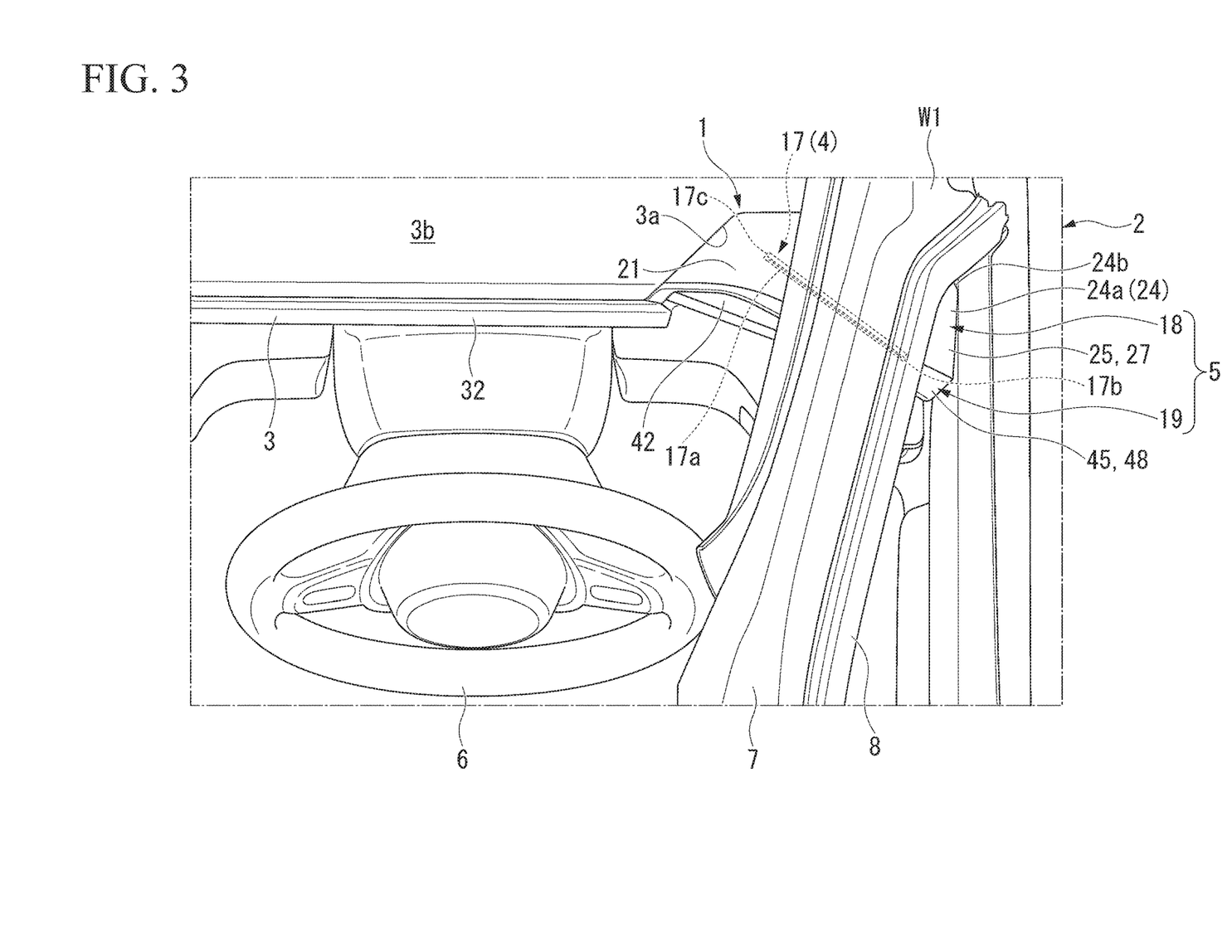
FIG. 3 is a view of the camera monitoring system according to the embodiment when seen from the directly upper side (upper side in a vertical direction).
Figure 4:
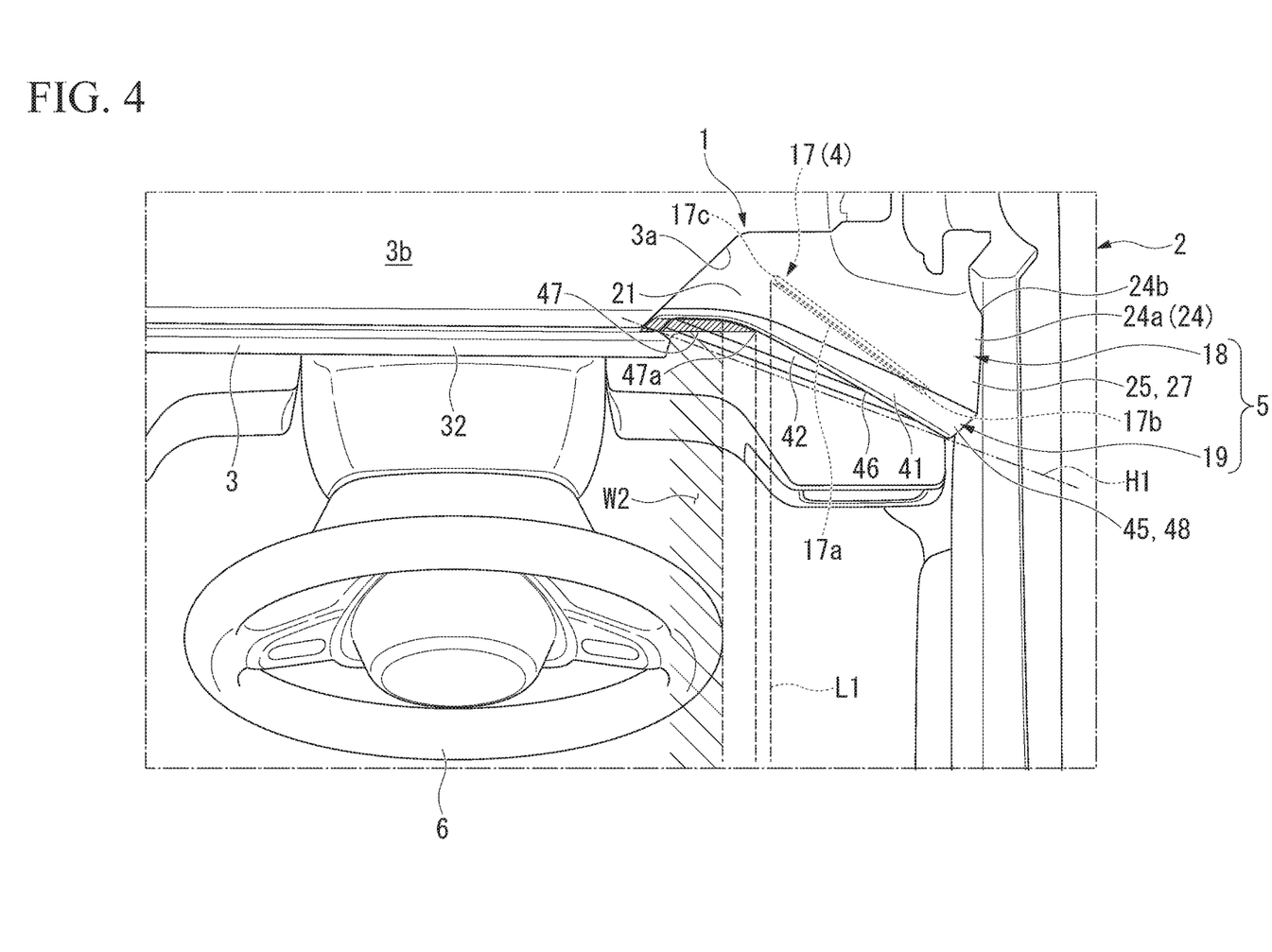
FIG. 4 is a view of the camera monitoring system according to the embodiment when seen from the directly upper side (upper side in the vertical direction) in which a front pillar is omitted.

FIG. 3 is a view of the camera monitoring system 1 when seen from the directly upper side (upper side in the vertical direction). FIG. 4 is a view in which the front pillar 7 of FIG. 3 is omitted.

As shown in FIG. 3 and FIG. 4, the display device 4 is arranged obliquely such that a display surface 17a of the display 17 faces the driver side. That is, the display surface 17a is arranged obliquely to gradually turn rearward as going outward in the vehicle width direction.

The display 17 is located further inward in the vehicle width direction than the outermost side in the vehicle width direction of a projection range W1 of the front pillar 7. In other words, when the camera monitoring system 1 is seen from the directly upper side, an outer end 17b in the vehicle width direction of the display 17 is located further inward in the vehicle width direction than the outermost side in the vehicle width direction of the front pillar 7.

The display 17 is located further outward in the vehicle width direction than a range W2 (hereinafter, simply referred to as a projection range W2 of the steering 6) in which the steering 6 is projected in a front-to-rear direction. In other words, when the camera monitoring system 1 is seen from the rear, an inner end 17c in the vehicle width direction of the display 17 is located further outward in the vehicle width direction than the outermost side in the vehicle width direction of the steering 6.

With reference back to FIG. 2, the control part 15 displays an image captured by a rear camera (not shown) on the display 12. The control part 15 includes, for example, a board 16 on which an element such as a central processing unit (CPU) is mounted. The image captured by the rear camera (not shown) is operationally processed by the element and output to the display 17.

(Housing)

Figure 5:
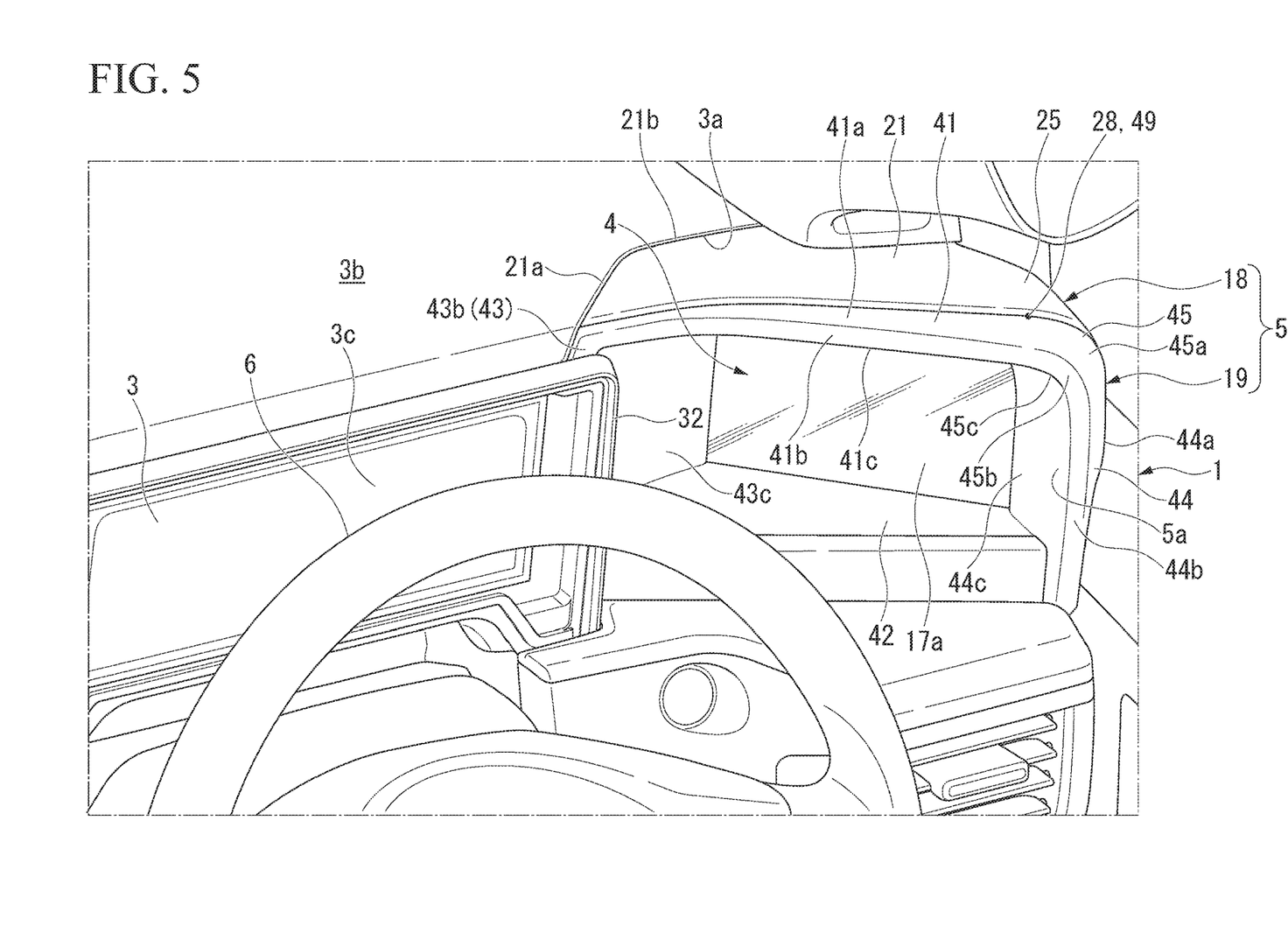
FIG. 5 is a perspective view of the camera monitoring system according to the embodiment when seen from the driver seat.
Figure 6:
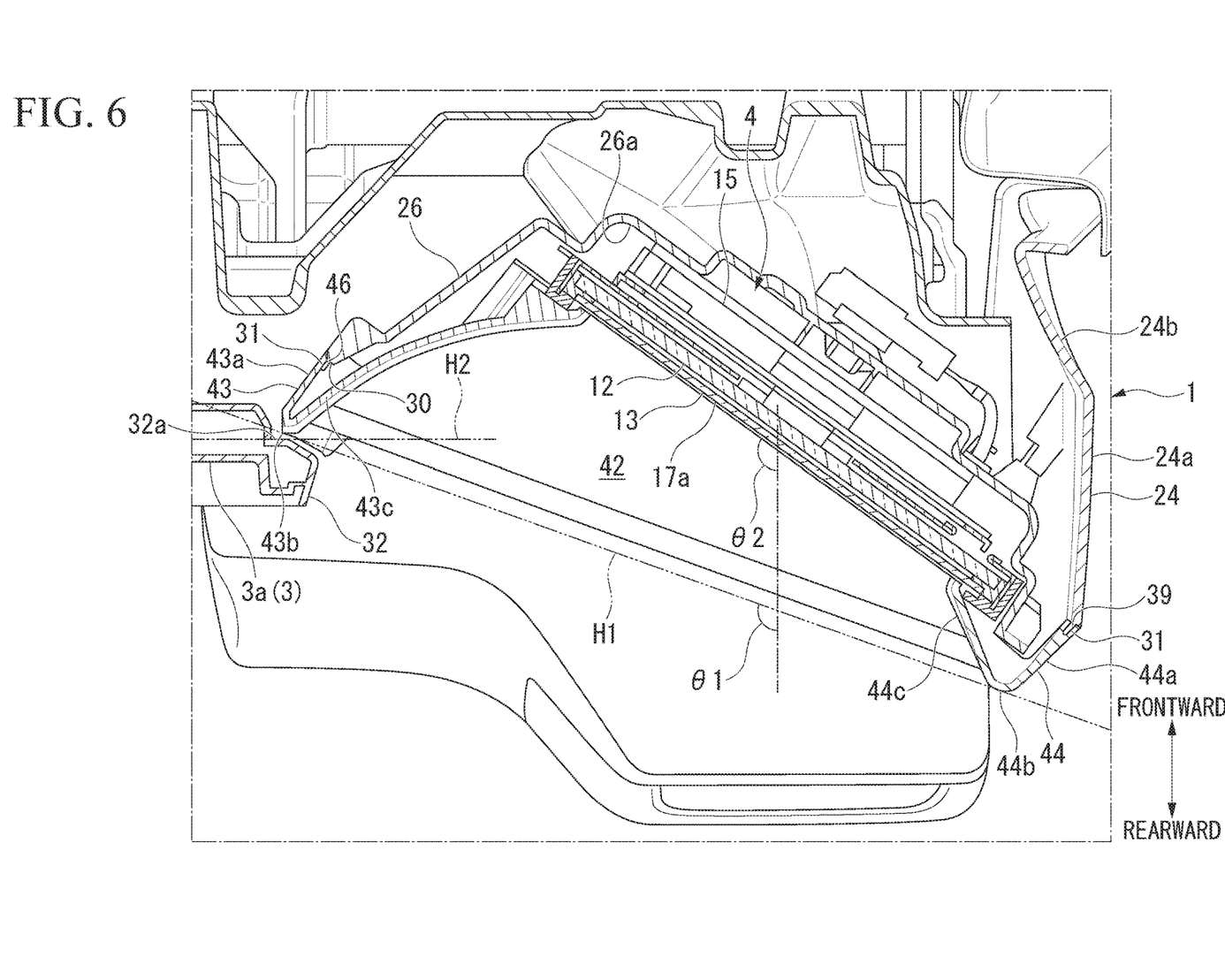
FIG. 6 is a cross-sectional view along a B-B line of FIG. 1.

FIG. 5 is a perspective view of the camera monitoring system 1 when seen from the driver seat. FIG. 6 is a cross-sectional view along a B-B line in FIG. 1.

As shown in FIG. 2 and FIGS. 4 to 6, the housing 5 is accommodated in an accommodation recess part 3a formed outside the instrument panel 3 in the vehicle width direction. The housing 5 is formed of, for example, a plastic. The housing 5 includes a housing main body 18 which covers an outer side of the vehicle and an upper side of the display device 4, and a visor rim part 19 (visor) which is fitted to the rear side of the housing main body 18 and which forms an opening part 5*a* of the housing 5. The housing 5 is arranged obliquely to correspond to a direction of the display device 4 (display surface 17*a*) such that the opening part 5*a* faces slightly inward in the vehicle width direction from the outside in the vehicle width direction.

(Housing Main Body)

The housing main body 18 is formed in an L shape when seen from the opening part 5*a* side. That is, the housing main body 18 includes an upper surface 21 which is located above the display device 4 and which extends in the horizontal direction, an outer side surface 24 (side surface) which is located outside the display device 4 in the vehicle width direction and which extends in the vertical direction, a curved surface 25 which straddles the outer side surface 24 and the upper surface 21, and a rear cover 26 which is located inside the upper surface 21, the outer side surface 24 and the curved surface 25.

As shown in detail in FIG. 2 and FIG. 6, the rear cover 26 is formed in a box shape (bowl shape) of which a rear is open. The rear cover 26 is formed to correspond to a shape and an arrangement direction of the display device 4 such that an opening area becomes smaller through a step toward the front. The display device 4 is accommodated in an inner surface 26*a* of the rear cover 26 constituted as described above.

The outer side surface 24 is exposed from the instrument panel 3. In the outer side surface 24, a rear part 24*a* on the further rear side than a middle in the front-to-rear direction extends in the front-to-rear direction. A further front side than the middle in the front-to-rear direction of the outer side surface 24 is formed obliquely to gradually turn toward the display device 4 side as it goes toward the front. A seal lip (not shown) of the side door 9 is located on a further front side than the middle in the front-to-rear direction of the outer side surface 24.

As shown in detail in FIG. 4, the upper surface 21 is exposed from the instrument panel 3.

The upper surface 21 is located on substantially the same plane as an upper surface 3*b* of the instrument panel 3 (also refer to FIG. 1). One side inside the upper surface 21 is formed to correspond to a shape of the accommodation recess part 3*a* of the instrument panel 3. That is, one side of the upper surface 21 is formed obliquely such that a rear side 21*a* on a further rear side than the middle in the front-to-rear direction gradually turns toward the display device 4 side as it goes toward the front.

Among sides of the upper surface 21, a front side 21*b* on a further front side than the middle in the front-to-rear direction is formed such that an inclination angle with respect to the front-to-rear direction is larger than that of the rear side 21*a*. Thereby, the instrument panel 3 and the upper surface 21 are arranged side by side with almost no gap.

As shown in detail in FIG. 2, the upper surface 21 is formed to have a gradually downward gradient toward the front. A front part 21*c* of the upper surface 21 is bent and extends downward such that the inclination with the downward gradient further increases.

As shown in FIG. 1 and FIG. 5, the curved surface 25 which straddles the outer side surface 24 and the upper surface 21 is formed in a substantially arc shape when seen in the front-to-rear direction to have a downward gradient from the upper surface 21 toward the outer side surface 24.

The camera monitoring system 1 is arranged on the instrument panel 3 at an outer position in the vehicle width direction as far as possible. Therefore, as shown in detail in FIG. 3, when the camera monitoring system 1 is seen from the directly upper side, part of the curved surface 25 overhangs outward further than the front pillar 7 in the vehicle width direction. In other words, the curved surface 25 has a first overhanging part 27 which overhangs outward in the vehicle width direction further than the projection range W1 of the front pillar 7.

That is, the first overhanging part 27 is formed to have a downward gradient toward the outside in the vehicle width direction. The curved surface 25 is connected to the upper surface 21, and a connecting part 28 (refer to FIG. 1) between the upper surface 21 and the curved surface 25 is located further inward in the vehicle width direction than the outermost side in the vehicle width direction of the projection range W1 of the front pillar 7. That is, on the upper surface 21 side of the housing main body 18, the downward gradient starts from a further inner position in the vehicle width direction than the outermost side in the vehicle width direction of the projection range W1 of the front pillar 7, and the downward gradient continues to the outer side surface 24 as it is.

The housing main body 18 constituted as described above forms an edge part 30 that includes a side edge of the upper surface 21 on the opening part 5*a* side, a side edge of the outer side surface 24 on the opening part 5*a* side, and a side edge of the curved surface 25 on the opening part 5*a* side when seen from the rear.

As shown in detail in FIG. 2 and FIG. 6, a fitting protrusion part 31 which fits and fixes the visor rim part 19 is formed at positions on a peripheral edge of the edge part 30 corresponding to the upper surface 21, the outer side surface 24, and the curved surface 25.

(Visor Rim Part)

As shown in FIG. 2, FIG. 5, and FIG. 6, the visor rim part 19 is formed to protrude from the edge part 30 of the housing main body 18 toward the rear. The visor rim part 19 forms the opening part 5*a* of the housing 5. That is, the visor rim part 19 forms the opening part 5*a* having a frame shape in which an upper rim portion 41 located above the display device 4, a lower rim portion 42 located below the display device 4, an inner rim portion 43 located inside the display device 4 in the vehicle width direction, an outer rim portion 44 located outside the display device 4 in the vehicle width direction, and a curved rim portion 45 that straddles the upper rim portion 41 and the outer rim portion 44 are connected so as to correspond to the housing main body 18. The visor rim part 19 serves as a visor such that light from outside does not easily reflect on the display surface 17*a* of the display device 4.

Among the rim portions 41 to 45 of the visor rim part 19, each of the upper rim portion 41, the inner rim portion 43, the outer rim portion 44, and the curved rim portion 45 is formed in a substantially V shape in a cross-section.

That is, the upper rim portion 41 is formed by continuously and integrally forming an outer side surface 41*a* which extends obliquely downward toward the display device 4 side (inside of the opening part 5*a*) and rearward from the upper surface 21 of the housing main body 18, a bent portion 41*b* having a shape which is folded back forward from a rear end of the outer side surface 41*a*, and an inner side surface 41*c* which extends obliquely downward toward the display device 4 side as it goes to the display surface 17*a* of the display device 4 from an end of the bent portion 41*b* opposite to the outer side surface 41*a*.

The inner rim portion 43 is formed by continuously and integrally forming an outer side surface 43*a* which extends rearward from the rear cover 26 of the housing main body 18, a bent portion 43*b* having a shape which is folded back forward from a rear end of the outer side surface 43*a*, and an inner side surface 43c which is curved and extends toward the display device 4 side as it goes to the display surface 17a of the display device 4 from an end of the bent portion 43b opposite to the outer side surface 43a.

The outer rim portion 44 is formed by continuously and integrally forming an outer side surface 44a which extends obliquely toward the display device 4 side (inside of the opening part 5a) and rearward from the outer side surface 24 of the housing main body 18, a bent portion 44b having a shape which is folded back forward from a rear end of the outer side surface 44a, and an inner side surface 44c which extends obliquely toward the display device 4 side as it goes to the display surface 17a of the display device 4 from an end of the bent portion 44b opposite to the outer side surface 44a.

The curved rim portion 45 is formed by continuously and integrally forming an outer side surface 45a which extends obliquely toward the display device 4 side (inside of the opening part 5a) and rearward from the curved surface 25 of the housing main body 18, a bent portion 45b having a shape which is folded back forward from a rear end of the outer side surface 45a, and an inner side surface 45c which extends obliquely toward the display device 4 side as it goes to the display surface 17a of the display device 4 from an end of the bent portion 45b opposite to the outer side surface 45a. That is, the curved rim portion 45 has a second overhanging part 48 which overhangs further outward in the vehicle width direction than the projection range W1 of the front pillar 7.

The outer side surface 45a of the curved rim portion 45 is formed to correspond to the curved surface 25 of the housing main body 18. Therefore, the outer side surface 45a of the curved rim portion 45 is formed in substantially an arc shape to have a downward gradient from the upper rim portion 41 toward the outer rim portion 44 when seen in the front-to-rear direction. That is, the second overhanging part 48 is formed to have a downward gradient toward the outside in the vehicle width direction.

The outer side surface 45a of the curved rim portion 45 is connected to the outer side surface 41a of the upper rim portion 41.

A connecting portion 49 (refer to FIG. 1) between the outer side surface 41a of the upper rim portion 41 and the outer side surface 45a of the curved rim portion 45 is located further inward in the vehicle width direction than the outermost side in the vehicle width direction of the projection range W1 of the front pillar 7. That is, on the upper rim portion 41 side of the visor rim part 19, the downward gradient starts from a further inward position in the vehicle width direction than the outermost side in the vehicle width direction of the projection range W1 of the front pillar 7, and the downward gradient continues to the outer rim portion 44 as it is.

In each of the outer side surfaces 41a and 43a to 45a of the rim portions 41 and 43 to 45, a fitting recess portion 39 which is fitted to the fitting protrusion part 31 is formed on an end surface which is in contact with the housing main body 18. The visor rim part 19 is positioned with respect to the housing main body 18 by fitting the fitting recess portion 39 to the fitting protrusion part. The outer surface of the housing main body 18 and the outer surface of the visor rim part 19 are smoothly connected without a gap therebetween.

The bent portions 41b and 43b to 45b of the rim portions 41 and 43 to 45 constitute a rear edge of the visor rim part 19. Since the housing 5 is arranged obliquely to correspond to an orientation of the display device 4 (display surface 17a) such that the opening part 5a is slightly directed from the outside in the vehicle width direction to the inside in the vehicle width direction, the rear edge of the visor rim part 19 is also obliquely arranged. That is, the visor rim part 19 is arranged to overhang toward the rear of the vehicle as it goes outward in the vehicle width direction. Therefore, the bent portion 44b of the outer rim portion 44 overhangs further rearward than the bent portion 43b of the inner rim portion 43.

An inclination angle of the rear edge of the visor rim part 19 with respect to the front-to-rear direction, that is, as shown in FIG. 6, an inclination angle θ1 with respect to the front-to-rear direction of a virtual plane H1 that passes through the rear edges of the bent portion 43b of the inner rim portion 43 and the bent portion 44b of the outer rim portion 44 is smaller than an inclination angle θ2 with respect to the front-to-rear direction of the display surface 17a of the display device 4. Therefore, the inner rim portion 43 is formed such that an extension length of the inner side surface 43c is longer than that of the outer side surface 43a.

The housing 5 is arranged such that the bent portion 43b of the inner rim portion 43 is located in front of the instrument panel 3. More specifically, the bent portion 43b of the inner rim portion 43 is located in front of a frame body 32 that constitutes a screen 3c on which a speed indication or the like of the instrument panel 3 is displayed.

Hereinafter, a virtual plane H2 that faces a front end surface 32a of the frame body 32 which is close to the rear edge of the bent portion 43b of the inner rim portion 43 will be referred to as a rear end of the instrument panel 3.

Relative to each of the rim portions 41, 43 to 45 of the visor rim part 19 constituted in this way, the lower rim portion 42 of the visor rim part 19 extends to be gradually directed obliquely upward from the rear toward the front and is formed to be flat. The inclination angle θ1 of the rear edge of the visor rim part 19 with respect to the front-to-rear direction is smaller than the inclination angle θ2 of the display surface 17a of the display device 4 with respect to the front-to-rear direction. Therefore, the lower rim portion 42 is formed such that a width in the front-to-rear direction gradually increases toward the inside in the vehicle width direction. A gap between the housing 5 and the display device 4 is closed by such a visor rim part 19.

With reference back to FIG. 4, a shape of the upper rim portion 41 of the visor rim part 19 will be described in more detail.

As shown in FIG. 4, a first recess part 46 of which a depth gradually increases toward the front as it goes toward the inside in the vehicle width direction from an outer end in the vehicle width direction is formed on the upper rim portion 41. More specifically, the rear edge of the bent portion 41b of the upper rim portion 41 is inclined frontward with respect to the virtual plane H1 that passes through the rear edges of the bent portion 43b of the inner rim portion 43 and the bent portion 44b of the outer rim portion 44 as it goes toward the inside in the vehicle width direction from an outer end in the vehicle width direction. This inclined portion is the first recess part 46. A distance between the rear edge of the bent portion 41b of the upper rim portion 41 and the driver becomes longer toward the inside in the vehicle width direction by forming the first recess part 46.

A second recess part 47 is formed inside the upper rim portion 41 in the vehicle width direction except for a position that corresponds to the inner rim portion 43 (except for an inner end portion in the vehicle width direction). That is, the second recess part 47 is formed to be recessed frontward with respect to the rear end (virtual plane H2) of the instrument panel 3. The second recess part 47 is smoothly connected to the first recess part 46.

Furthermore, an outer end portion in the vehicle width direction of the second recess part 47, that is, a connecting portion 47a (end portion) between the first recess part 46 and the second recess part 47 is located between the outside in the vehicle width direction of the projection range W2 of the steering 6 and a virtual straight line L1 that passes through the inner end 17c in the vehicle width direction of the display 17 and that extends in the front-to-rear direction. The virtual straight line L1 means an inner end portion in the vehicle width direction of a range in which the display 17 is projected in the front-to-rear direction.

The second recess part 47 is formed such that the projection range W2 of the steering 6 is the deepest. Thereby, a distance between the driver and a portion of the upper rim portion 41 at which the second recess part 47 is formed and which is also within the projection range W2 of the steering 6 is the longest.

(Operation of Housing)

Next, an operation of the housing 5 will be described.

The camera monitoring system 1 is provided on the upper side and on both sides in the vehicle width direction of the instrument panel 3. Thereby, a line of sight along which the conventional door mirror is viewed is matched with a line of sight along which the display 17 of the camera monitoring system 1 is viewed as much as possible. On the other hand, the housing 5 of the camera monitoring system 1 is easily exposed to raindrops because it is located outward in the vehicle width direction. In particular, raindrops are likely to adhere to a portion which protrudes outward in the vehicle width direction beyond the front pillar 7. That is, as shown in FIG. 1 and FIG. 3, in the housing 5, raindrops U are likely to adhere to each of the overhanging parts 27 and 48 which overhang further outward in the vehicle width direction than the projection range W1 of the front pillar 7.

However, the first overhanging part 27 of the overhanging parts 27 and 48 is part of the curved surface 25 formed on the housing main body 18 of the housing 5. The second overhanging part 48 of the overhanging parts 27 and 48 is part of the curved rim portion 45 formed on the visor rim part 19. The curved surface 25 and the curved rim portion 45 are formed to be curved and to have a downward gradient toward the outside in the vehicle width direction. Therefore, the raindrops U adhering to the overhanging parts 27 and 48 flow along the curved surface 25 or the curved rim portion 45 to the outer side surface 24 and the outer rim portion 44 and are discharged downward of the vehicle.

Additionally, the curved rim portion 45 has the outer side surface 45a which extends obliquely toward the display device 4 side (inside of the opening part 5a) and rearward from the curved surface 25 of the housing main body 18. Therefore, in the visor rim part 19, the second overhanging part 48 which overhangs further outward in the vehicle width direction than the projection range W1 of the front pillar 7 is minimized. Accordingly, it becomes difficult for the raindrops U to adhere to the visor rim part 19.

Further, since the camera monitoring system 1 is provided on the upper side and on both sides in the vehicle width direction of the instrument panel 3, external light easily reflects on the display surface 17a of the display 17. However, since the housing 5 has a visor rim part 19 that protrudes rearward, it is difficult for the external light to reflect on the display surface 17a of the display 17.

When the visor rim part 19 merely protrudes rearward, the driver may feel a sense of pressure, the occupant's comfort in the driver seat may deteriorate, and a driver's hand may be caught by the visor rim part 19. However, since the first recess part 46 and the second recess part 47 are formed on the upper rim portion 41 of the visor rim part 19, a distance between the rear edge of the bent portion 41b of the upper rim portion 41 and the driver can be ensured as much as possible. As a result, the occupant's comfort in the driver seat is improved, and the driver's hand is not easily caught by the visor rim part 19.

Further, the first recess part 46 is not simply recessed in the upper rim portion 41 but is inclined frontward as it goes inward in the vehicle width direction from the outer end portion in the vehicle width direction. Therefore, the upper rim portion 41 overhangs rearward of the vehicle on the outside in the vehicle width direction of the visor rim part 19, and a distance between the driver and the upper rim portion 41 becomes longer therefrom toward the inside in the vehicle width direction. Accordingly, it is difficult for the external light to reflect on the display surface 17a of the display 17 while improving the occupant's comfort in the driver seat and preventing the driver's hand from being caught by the visor rim part 19.

In this way, the camera monitoring system 1 described above includes the display device 4 provided on the upper side and on both sides in the vehicle width direction of the instrument panel 3 and the housing 5 formed to surround the periphery of the display device 4. The housing 5 includes the housing main body 18 that covers the display device 4 from the front and the visor rim part 19 that forms the opening part 5a of the housing 5. The visor rim part 19 additionally serves as a visor such that external light does not easily reflect on the display surface 17a of the display device 4. The first recess part 46 inclined frontward as it goes toward the inside in the vehicle width direction from the outer end in the vehicle width direction is formed on such a visor rim part 19. Therefore, at the outside in the vehicle width direction of the camera monitoring system 1, the upper rim portion 41 of the visor rim part 19 prevents the external light from reflecting on the display 17. Accordingly, it is possible to ensure good visibility of the display 17. Further, at the inside in the vehicle width direction of the camera monitoring system 1 close to the driver side, it is possible to sufficiently ensure the distance between the driver and the upper rim portion 41 of the visor rim part 19. As a result, it is possible to prevent the driver's hand from being caught by the visor rim part 19 without degrading the occupant's comfort in the driver seat.

Further, since the housing 5 of the camera monitoring system 1 is arranged obliquely to correspond to the direction of the display device 4 (display surface 17a) such that the opening part 5a faces slightly inward in the vehicle width direction from the outside in the vehicle width direction, the rear edge of the visor rim part 19 is also obliquely arranged. That is, the visor rim part 19 is arranged to overhang in the vehicle rearward direction toward the outside in the vehicle width direction. Therefore, the driver can easily look at the display 17 only by directing the line of sight to the camera monitoring system 1, it is possible to prevent the external light from reflecting on the display surface 17a of the display device 4, and it is also possible to reduce the reflection of the display 17 on the side window.

In such an orientation of the camera monitoring system 1, the second recess part 47 that continues to the first recess part 46 is formed inside the upper rim portion 41 in the vehicle width direction except for a position that corresponds to the inner rim portion 43 (except for an inner end portion in the vehicle width direction). That is, the second recess part 47 is formed to be recessed frontward with respect to the rear end (virtual plane H2) of the instrument panel 3. Therefore, it is possible to further prevent the external light from reflecting on the display surface 17a of the display device 4, and it is possible to further reduce the reflection of the display 17 on the side window. Further, by the second recess part 47, it is possible to further sufficiently ensure the distance between the upper rim portion 41 and the driver. As a result, it is possible to further prevent the driver's hand from being caught by the visor rim part 19 without degrading the occupant's comfort in the driver seat.

Further, the second recess part 47 is formed to be recessed frontward with respect to the rear end (virtual plane H2) of the instrument panel 3. The outer end portion in the vehicle width direction of the second recess part 47, that is, the connecting portion 47a between the first recess part 46 and the second recess part 47 is located between the outside in the vehicle width direction of the projection range W2 of the steering 6 and the virtual straight line L1 that passes through the inner end 17c in the vehicle width direction of the display 17 and that extends in the front-to-rear direction.

Therefore, it is possible to reliably ensure the distance between the visor rim part 19 and the driver, and it is possible to reliably prevent the driver's hand from being caught by the upper rim portion 41. Further, it is possible to prevent it from occurring that the display 17 is hard to see due to the obstacle such as the steering 6, the driver's arm, and the driver's hand.

Further, the second recess part 47 is formed such that the projection range W2 of the steering 6 is the deepest. Thereby, the distance between the driver and a portion of the upper rim portion 41 at which the second recess part 47 is formed and which is also within the projection range W2 of the steering 6 is the longest. Therefore, it is possible to reliably ensure the distance between the visor rim part 19 and the driver effectively. Therefore, it is possible to reliably prevent the occupant's comfort in the driver seat from being degraded, and it is possible to reliably prevent the driver's hand from being caught by the visor.

The present invention is not limited to the embodiment described above, and various modifications can be made to the embodiment described above without departing from the scope of the present invention.

For example, the above embodiment is described using a case in which the camera monitoring system 1 includes the display device 4 and the housing 5 formed to surround the periphery of the display device 4. However, the present invention is not limited thereto, and the camera monitoring system 1 may be an apparatus which can visually recognize the rear of the vehicle 2.

Further, the above embodiment is described using a case in which the camera monitoring system 1 is provided on both sides in the vehicle width direction of the vehicle 2. The above embodiment is described using a case in which the basic configurations of the two camera monitoring systems 1 are the same, and the two camera monitoring systems 1 are arranged in line symmetry with respect to the middle in the vehicle width direction. That is, also in the housing 5 on the passenger seat side, the first recess part 46 and the second recess part 47 are formed on the upper rim portion 41. However, the present invention is not limited thereto, and the first recess part 46 or the second recess part 47 formed on the upper rim portion 41 may be provided on only the camera monitoring system 1 on the driver seat side.

Further, the above embodiment is described using a case in which the first recess part 46 and the second recess part 47 are formed on the upper rim portion 41. However, the present invention is not limited thereto, and it is sufficient that at least the first recess part 46 is formed. Also in this case, it is possible to ensure good visibility of the display 17, and it is possible to prevent the driver's hand from being caught by the visor rim part 19 without degrading the occupant's comfort in the driver seat.

Further, the above embodiment is described using a case in which the first recess part 46 formed on the upper rim portion 41 is formed to be inclined frontward from the outer end portion in the vehicle width direction toward the inside in the vehicle width direction. However, the present invention is not limited thereto, and the first recess part 46 may be formed such that the depth thereof becomes gradually deeper frontward as it goes toward the inside in the vehicle width direction from the outer end portion in the vehicle width direction. That is, the first recess part 46 may be formed to be curved when seen from the upper side.

Further, the above embodiment is described using a case in which, in the housing main body 18, the connecting part 28 between the upper surface 21 and the curved surface 25 is located further inward in the vehicle width direction than the outermost side in the vehicle width direction of the projection range W1 of the front pillar 7. Furthermore, the above embodiment is described using a case in which, in the visor rim part 19, the connecting portion 49 between the outer side surface 41a of the upper rim portion 41 and the outer side surface 45a of the curved rim portion 45 is located further inward in the vehicle width direction than the outermost side in the vehicle width direction of the projection range W1 of the front pillar 7. However, the present invention is not limited thereto, and the curved surface 25 or the curved rim portion 45 may be formed such that at least the overhanging parts 27 and 48 have a downward gradient toward the outside in the vehicle width direction. Further, instead of the curved surface 25 or the curved rim portion 45, a flat inclined surface having a downward gradient may be used.

Further, the above embodiment is described using a case in which the curved surface 25 or the curved rim portion 45 has a downward gradient. However, the present invention is not limited thereto, and the upper surface 21 of the housing main body 18 and the outer surface 41a of the upper rim portion 41 may also have a downward gradient toward the outside in the vehicle width direction.

Further, the above embodiment is described using a case in which the housing 5 is divided into the housing main body 18 and the visor rim part 19. However, the present invention is not limited thereto, and the housing main body 18 and the visor rim part 19 may be integrally formed.

What is claimed is:

1. A rearview monitor apparatus, comprising:
    a display provided on an instrument panel of a vehicle, arranged further outward in a vehicle width direction than a range in which a steering is projected in a front-to-rear direction of the vehicle, and that displays a captured external image to a driver; and
    a housing formed to surround a periphery of the display, wherein the housing includes
        an upper surface arranged above the display,
        a side surface arranged outside in the vehicle width direction of the display and that faces the outside, and
        a visor that extends in a vehicle rearward direction beyond the display from vehicle rearward positions of the upper surface and the side surface and that forms an opening part in a vehicle rearward direction, and
        a first recess part of which a depth gradually increases toward a vehicle frontward direction towards an inside in the vehicle width direction from an outer end in the vehicle width direction is formed on the upper surface side of the visor.

2. The rearview monitor apparatus according to claim 1, wherein the visor is arranged obliquely so as to extend in a vehicle rearward direction towards the outside in the vehicle width direction, and a second recess part recessed in a vehicle frontward direction with respect to a rear end of an upper surface of the instrument panel and that continues to the first recess part is formed at the inside in the vehicle width direction on the upper surface side of the visor.

3. The rearview monitor apparatus according to claim 2, wherein an outer end portion in the vehicle width direction of the second recess part is located between an outermost portion in the vehicle width direction of the projected range of the steering and the inside in the vehicle width direction of a range in which the display is projected in the front-to-rear direction of the vehicle.

4. The rearview monitor apparatus according to claim 1, wherein in the upper surface of the visor, a part at the outermost in the vehicle width direction of the projected range of the steering is located at a vehicle forefront position.

5. The rearview monitor apparatus according to claim 2, wherein in the upper surface of the visor, a part at the outermost in the vehicle width direction of the projected range of the steering is located at a vehicle forefront position.

6. The rearview monitor apparatus according to claim 3, wherein in the upper surface of the visor, a part at the outermost in the vehicle width direction of the projected range of the steering is located at a vehicle forefront position.

* * * * *